United States Patent
Edwards et al.

(10) Patent No.: US 6,803,096 B2
(45) Date of Patent: Oct. 12, 2004

(54) ENGINEERING THERMOPLASTIC POLYURETHANE REINFORCED WITH GLASS MAT

(75) Inventors: Christopher M. Edwards, Midland, MI (US); Edward L. d'Hooghe, Hulst (NL)

(73) Assignee: AVC Holdings Inc., Midland, MI (US)

( * ) Notice: Subject to any disclaimer, the term of this patent is extended or adjusted under 35 U.S.C. 154(b) by 163 days.

(21) Appl. No.: 10/066,520

(22) Filed: Jan. 31, 2002

(65) Prior Publication Data

US 2002/0119719 A1 Aug. 29, 2002

Related U.S. Application Data

(60) Provisional application No. 60/266,491, filed on Feb. 5, 2001.

(51) Int. Cl.$^7$ ................................. B32B 27/04
(52) U.S. Cl. ................. 428/297.4; 428/299.4
(58) Field of Search ............................. 428/297.4, 299.4

(56) References Cited

U.S. PATENT DOCUMENTS

| | | | |
|---|---|---|---|
| 3,661,887 A | 5/1972 | Leebrick | 260/18 |
| 4,098,943 A | 7/1978 | Degginger et al. | 428/283 |
| 4,376,834 A | 3/1983 | Goldwasser et al. | 521/159 |
| 4,385,133 A | 5/1983 | Alberino et al. | 521/159 |
| 4,469,543 A | 9/1984 | Segal | 156/283 |
| 4,522,975 A | 6/1985 | O'Connor et al. | 524/702 |
| 5,167,899 A | 12/1992 | Jezic | 264/510 |
| 5,627,254 A | 5/1997 | Oriani | 528/76 |
| 5,891,560 A | 4/1999 | Edwards et al. | 428/295 |
| 2002/0058780 A1 * | 5/2002 | Moses et al. | 528/403 |
| 2002/0063349 A1 * | 5/2002 | Edwards et al. | 264/1.28 |
| 2002/0094427 A1 * | 7/2002 | Edwards et al. | 428/297.4 |

* cited by examiner

Primary Examiner—Arti R. Singh

(57) ABSTRACT

The present invention provides a glass mat thermoplastic comprising a glass mat impregnated with an engineering thermoplastic polyurethane (ETPU) having a $T_g$ of at least 50° C. The glass mat thermoplastic can be prepared, for example, by a) contacting a continuous glass mat with ETPU film or sheet, or between ETPU films or sheets, with sufficient pressure and heat to form a multilayered structure which contains a wetted out glass mat layer sandwiched between an ETPU layer and a glass mat layer, b) thermoforming or compression molding the multilayered structure with sufficient heat to substantially completely wet out the glass mat with the ETPU; and c) cooling the substantially wetted out thermoformed glass mat to a temperature below the $T_g$ of the ETPU. The efficiency with which the depolymerizable and repolymerizable ETPU can be impregnated into the glass mat matrix results in a GMT with excellent physical properties.

9 Claims, No Drawings

ENGINEERING THERMOPLASTIC POLYURETHANE REINFORCED WITH GLASS MAT

CROSS-REFERENCE STATEMENT

This application claims the benefit of U.S. Provisional application No. 60/266,491, filed Feb. 5, 2001, now expired.

BACKGROUND OF THE INVENTION

This invention relates to continuous glass-reinforced engineering thermoplastic polyurethane sheets. A major drawback in the continuous production of glass reinforced thermoplastic sheets (also known as glass mat thermoplastics or GMT) is the inefficiency of impregnating the layer of glass fiber with the viscous thermoplastic layer. Consequently, somewhat complex methods requiring the use of additional extruders have been devised to promote fiber impregnation, such as the method disclosed by Degginger et al. in U.S. Pat. No. 4,098,943.

To address in part the deficiencies of Dregginger et al., Segal et al, in U.S. Pat. No. 4,469,543 discloses a method for continuously laminating a thermoplastic layer that is reinforced with fiber filler to a glass fiber mat reinforcing layer, wherein the glass fiber is thoroughly impregnated with thermoplastic resin. The impregnation is achieved by laminating between each reinforced layer/glass-fiber mat interface a layer of non-filled thermoplastic polymer that is compatible with the thermoplastic polymer of the reinforced layer. In a preferred embodiment of the invention, the thermoplastic is a polyamide.

Nevertheless, efficient and effective impregnation of resin into a glass mat remains a challenge. It would therefore be an advance in the art of GMT to discover a resin that can wet out the glass fibers in a glass mat completely and efficiently.

SUMMARY OF THE INVENTION

The present invention addresses a need in the art by providing a glass mat thermoplastic comprising a glass mat impregnated with an engineering thermoplastic polyurethane having a $T_g$ of at least 50° C.

In a second aspect, the present invention is a process for preparing a glass mat thermoplastic comprising the steps of a) contacting a continuous glass mat with an engineering thermoplastic polyurethane (ETPU) film or sheet with sufficient pressure and heat to form a multilayered structure which contains a wetted out glass mat layer sandwiched between an ETPU layer and a glass mat layer, wherein the ETPU layer has a $T_g$ of at least 50° C.; b) thermoforming or compression molding the multilayered structure with sufficient heat to substantially completely wet out the glass mat with the ETPU; and c) cooling the substantially wetted out thermoformed glass mat to a temperature below the $T_g$ of the ETPU.

In a third aspect, the present invention is a process for preparing a glass mat thermoplastic comprising the steps of a) contacting a continuous glass mat between a first engineering thermoplastic polyurethane (ETPU) film or sheet and a second engineering thermoplastic polyurethane film or sheet with sufficient pressure and heat to form multilayered partially wetted out glass mat, wherein the ETPU layer has a $T_g$ of at least 50° C.; b) thermoforming or compression molding the partially wetted out glass mat with sufficient heat to substantially completely wet out the glass mat with the ETPU; and c) cooling the substantially wetted out thermoformed glass mat to a temperature below the $T_g$ of the ETPU.

DETAILED DESCRIPTION OF THE INVENTION

The GMT of the present invention can be prepared with ease and efficiency because of the dramatic decrease of viscosity of the ETPU (also known as a rigid thermoplastic polyurethane) when subjected to sufficient heat to at least partially depolymerize the polymer. This decrease in viscosity allows for complete impregnation of the resin into the glass mat at advanced temperatures as well as facile thermoforming of the wetted out glass mat. Upon cooling, the resin repolymerizes so that the resultant GMT is reinforced with a high molecular weight resin that imparts superior physical properties to the GMT as compared to the GMTs known in the art.

The GMT can be prepared by any suitable method such as those well known in the art. In a preferred method of preparing the GMT, continuous glass mat, which is preferably drawn from a roll, is first contacted under conditions of pressure and heat with a film or sheet of ETPU resin which has preferably been formed by extrusion. The glass mat may be prepared from continuous fibers or chopped fibers that are layed randomly onto a belt and contacted with binder (random mat or chopped strand mat), or by weaving continuous glass into a desired pattern (woven). In this first step, the ETPU layer is maintained at a temperature at or near the melting point of the ETPU, which is typically in the range of about 180° C. to about 200° C. After contact of the glass mat and the ETPU film or sheet, three layers are discernable: 1) an unadulterated ETPU layer; 2) a dry glass mat layer; and 3) an intermediate layer between the ETPU layer and dry glass mat layer that contains fiber that adheres to and is wetted out by ETPU.

In a subsequent thermoforming step of the multilayered structure, the glass exhibits a minimal amount of wrinkling because it is not constrained by the matrix and, therefore, can move more freely. The temperature is increased so that the viscosity of the ETPU decreases sufficiently to substantially completely wet out the glass mat, preferably to about 220° C. to about 240° C., thereby ensuring optimum physical properties. The wetted out glass mat is then cooled to form a GMT of desired shape and size.

The GMT of the present invention may also be designed, using any suitable method and preferably the methods described above, to include a multilayered GMT, for example, by co-extruding the ETPU and a second thermoplastic material, which forms an outside (that is, exposed) layer to the GMT, to impart additional properties to one or both of the major surfaces of the GMT. For example, polysulfone, polycarbonate, polyphenylene oxide, and polyvinyl chloride all impart ignition resistance, which can be tuned with the addition of flame retardant compounds such as well known brominated compounds. An acrylic or ABS layer would impart scratch resistance and enhanced UV resistance; a soft TPU layer ($T_g$ of less than 25° C.) would impart soft touch and abrasion resistance. Polar thermoplastics are compatible with ETPU and do not generally require ancillary adhesives. On the other hand, non-polar thermoplastics such as polypropylene and polystyrene are preferably used in the presence of a suitable compatiblizer such as a copolymer of ethylenevinyl acetate.

The ETPU can be prepared by methods well known in the art, such as those described by Goldwasser et al. in U.S. Pat. No. 4,376,834, by Edwards et al. in U.S. Pat. No. 5,891,560, by Oriani in U.S. Pat. No. 5,627,254. The ETPU is a single- or two-phase polymer that can be prepared by the reaction of approximately stoichiometric amounts of: a) a diisocyanate; b) a low molecular weight diol (not more than 300 Daltons), c) optionally a high molecular weight diol (molecular weight generally in the range of from about 500 to about 8000 Daltons). The low molecular weight diol, in combination with the diisocyanate contributes to what is known as the "hard segment content", and the high molecular weight compound, in combination with the diisocyanate, contributes to what is known as the "soft segment content".

The ETPU has a $T_g$ of not less than 50° C. and typically has a hard segment content of at least 75 weight percent, more preferably at least 90 weight percent, most preferably 100 weight percent, based on the weight of the ETPU. ETPUs are commercially available under the trade name ISOPLAST™ engineering thermoplastic polyurethanes (a trademark of The Dow Chemical Company).

Preferred diisocyanates include aromatic, aliphatic, and cycloaliphatic diisocyanates and combinations thereof. Representative examples of these preferred diisocyanates can be found in U.S. Pat. Nos. 4,385,133; 4,522,975; and 5,167,899, which teachings are incorporated herein by reference. Preferred diisocyanates include 4,4'-diisocyanatodiphenylmethane, p-phenylene diisocyanate, 1,3-bis(isocyanatomethyl)-cyclohexane, 1,4-diisocyanato-cyclohexane, hexamethylene diisocyanate, 1,5-naphthalene diisocyanate, 3,3'-dimethyl-4,4'-biphenyl diisocyanate, 4,4'-diisocyanato-dicyclohexylmethane, and 2,4-toluene diisocyanate. More preferred are 4,4'-diisocyanato-dicyclohexylmethane and 4,4'-diisocyanato-diphenylmethane. Most preferred is 4,4'-diisocyanatodiphenylmethane.

Preferred low molecular weight diols include ethylene glycol, 1,3-propanediol, 1,4-butanediol, 1,5-pentanediol, 1,6-hexanediol, diethylene glycol, triethylene glycol, tripropylene glycol, tetraethylene glycol, neopental glycol, 1,4-cyclohexanediol, 1,4-cyclohexanedimethanol, 1,4-(bishydroxyethyl)-hydroquinone, 2,2-bis(β-hydroxy-4-ethoxyphenyl)propane (i.e., ethoxylated bisphenol A), and mixtures thereof. More preferred chain extenders are 1,4-butanediol, 1,6-hexanediol, 1,4-cyclohexanedimethanol, diethylene glycol, triethylene glycol, tripropylene glycol, and mixtures thereof.

The ETPU may optionally contain structural units formed from a high molecular weight diol, which is preferably a glycol having a molecular weight in the range of preferably not less than about 750, more preferably not less than about 1000, and most preferably not less than about 1500; and preferably not more than about 6000, and more preferably not more than about 5000. These high molecular weight glycol units constitute a sufficiently low fraction of the ETPU such that the $T_g$ of the ETPU is above 50° C. Preferably, the high molecular weight glycol units constitute not more than about 25, more preferably not more than about 10, and most preferably not more than about 5 weight percent of the ETPU, to about 0 weight percent of the ETPU.

The isocyanate-to-OH ratio of the reactants varies from about 0.95:1, preferably from about 0.975:1, and more preferably from 0.985:1, to about 1.05:1, preferably to about 1.025:1, and more preferably to about 1.015:1.

The ETPU, is advantageously prepared in the presence of an effective amount of a hydrolytically- and thermally-stable catalyst, which catalyzes the reaction between the isocyanate groups and the hydroxyl groups, to form urethane linkages, and remains active during the depolymerization of the polymer to catalyze the re-formation of urethane bonds, and the rebuilding of molecular weight. Examples of such catalysts are $Sn^{+2}$ such as stannous octoate; and $Sn^{+4}$ catalysts such as dialkyltin dimercaptides, preferably dimethyltin dimercaptide (available as FOMREZ™ UL-22, a trademark of Witco Chemical), and dialkyltin dicarboxylates, such as those disclosed in detail in U.S. Pat. No. 3,661,887. Preferably, the catalyst is present at an amount from about 0.001 to about 5 weight percent, based on the weight of the reactants The GMT of the present invention is useful, for example, as panel structures in automotive vehicles, furniture or other industrial applications, as well as lamination for wood.

What is claimed is:

1. A glass mat thermoplastic comprising a glass mat impregnated with an engineering thermoplastic polyurethane having a $T_g$ of at least 50° C.

2. The glass mat thermoplastic of claim 1 wherein the glass mat is a woven glass mat.

3. The glass mat thermoplastic of claim 1 wherein the glass mat is a random glass or chopped strand mat.

4. The glass mat thermoplastic of claim 1 wherein the engineering thermoplastic polyurethane has a hard segment content of at least 90 weight percent, based on the weight of the engineering thermoplastic polyurethane.

5. The glass mat thermoplastic of claim 4 wherein the engineering thermoplastic polyurethane has a hard segment content of 100 weight percent, based on the weight of the engineering thermoplastic polyurethane.

6. The glass mat thermoplastic of claim 1 which is a multilayered glass mat thermoplastic, wherein a second thermoplastic layer that is not in contact with the glass mat is adhered to the engineering thermoplastic polyurethane.

7. The glass mat thermoplastic of claim 6 wherein the second thermoplastic layer is a polar thermoplastic selected from the group consisting of polysulfone, polycarbonate, polyphenylene oxide, polyvinyl chloride, ABS, thermoplastic polyurethane having a $T_g$ of less than 25° C., and acrylic.

8. The glass mat thermoplastic of claim 6 which further include a compatibilizer to adhere the second thermoplastic layer to the engineering thermoplastic polyurethane, wherein the second thermoplastic layer is a nonpolar thermoplastic selected from the group consisting of polypropylene and polystyrene.

9. The glass mat thermoplastic of claim 8 wherein the compatibilizer is a copolymer of ethylene-vinyl acetate.

* * * * *